US007292841B2

(12) United States Patent
Trandal et al.

(10) Patent No.: US 7,292,841 B2
(45) Date of Patent: *Nov. 6, 2007

(54) CALL ROUTING APPARATUS (75) Inventors: David S. Trandal, Santa Barbara, CA (US); David J. Brahm, Santa Barbara, CA (US)

(73) Assignee: Callwave, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/212,536

(22) Filed: Aug. 26, 2005

(65) Prior Publication Data
US 2006/0003735 A1    Jan. 5, 2006

Related U.S. Application Data (63) Continuation of application No. 10/106,517, filed on Mar. 22, 2002, now Pat. No. 6,968,174.

(60) Provisional application No. 60/278,570, filed on Mar. 22, 2001, provisional application No. 60/309,142, filed on Jul. 30, 2001.

(51) Int. Cl.
H04M 11/06 (2006.01)
(52) U.S. Cl. ............ 455/406; 379/114.01; 379/114.25; 455/405
(58) Field of Classification Search ........ 455/405–408, 455/415–417; 379/111, 112.01, 114.01, 379/114.14, 114.2, 114.24, 114.25, 127.01, 379/133–134
See application file for complete search history.

(56) References Cited

U.S. PATENT DOCUMENTS

| 4,994,926 A | 2/1991 | Gordon et al. |
| 5,291,302 A | 3/1994 | Gordon et al. |
| 5,459,548 A | 10/1995 | Matsuda et al. |
| 5,459,584 A | 10/1995 | Gordon et al. |
| 5,467,388 A | 11/1995 | Redd, Jr. et al. |
| 5,533,102 A | 7/1996 | Robinson et al. |
| 5,577,111 A | 11/1996 | Iida et al. |
| 5,651,054 A | 7/1997 | Dunn et al. |
| 5,668,852 A | 9/1997 | Holmes |
| 5,805,587 A | 9/1998 | Norris et al. |
| 5,809,128 A | 9/1998 | McMullin |
| 5,825,867 A | 10/1998 | Epler et al. |
| 5,835,573 A | 11/1998 | Dee et al. |
| 5,884,032 A | 3/1999 | Bateman et al. |
| 5,995,603 A | 11/1999 | Anderson |

(Continued)

FOREIGN PATENT DOCUMENTS

WO    WO 00/60840    10/2000

*Primary Examiner*—Duc M. Nguyen
*Assistant Examiner*—Michael Thier
(74) *Attorney, Agent, or Firm*—Knobbe, Martens, Olson & Bear LLP (57) ABSTRACT The present invention relates generally to telecommunications, and in particular to systems and methods for routing and placing telephone calls. In one embodiment, a call manager system is configured to place a call to a pay-per-call service, or to cause such a call to be placed by a user computer terminal, in response to a user initiating a purchase transaction over a computer network. In addition, the call may include billing information, such as the user's phone number, which is provided to the pay-per-call service so that the user can be billed for the call in an appropriate amount.

26 Claims, 4 Drawing Sheets

U.S. PATENT DOCUMENTS

| | | |
|---|---|---|
| 6,031,896 A | 2/2000 | Gardell et al. |
| 6,035,031 A | 3/2000 | Silverman |
| 6,169,795 B1 | 1/2001 | Dunn et al. |
| 6,208,638 B1 | 3/2001 | Rieley et al. |
| 6,282,276 B1 | 8/2001 | Felger |
| 6,304,565 B1 | 10/2001 | Ramamurthy |
| 6,310,939 B1 | 10/2001 | Varney |
| 6,345,090 B1 | 2/2002 | Walker et al. |
| 6,350,066 B1 | 2/2002 | Bobo, II |
| 6,405,035 B1 | 6/2002 | Singh |
| 6,430,274 B1 | 8/2002 | Winstead et al. |
| 6,438,222 B1 | 8/2002 | Burg |
| 6,477,246 B1 | 11/2002 | Dolan et al. |
| 6,505,163 B1 | 1/2003 | Zhang et al. |
| 6,549,612 B2 | 4/2003 | Gifford et al. |
| 6,564,321 B2 | 5/2003 | Bobo, II |
| 6,643,034 B1 | 11/2003 | Gordon et al. |
| 6,690,785 B1 | 2/2004 | Stelter et al. |
| 6,738,461 B2 | 5/2004 | Trandal et al. |
| 6,751,299 B1 | 6/2004 | Brown et al. |
| 6,785,021 B1 | 8/2004 | Gordon et al. |
| 6,857,074 B2 | 2/2005 | Bobo, II |
| 6,879,677 B2 | 4/2005 | Trandal et al. |
| 6,898,275 B2 | 5/2005 | Dolan et al. |
| 6,968,174 B1 | 11/2005 | Trandal et al. |
| 6,981,214 B1 * | 12/2005 | Miller et al. ................ 715/517 |
| 7,103,167 B2 | 9/2006 | Brahm et al. |
| 2002/0010616 A1 | 1/2002 | Itzhaki |
| 2002/0097710 A1 | 7/2002 | Burg |
| 2002/0176558 A1 | 11/2002 | Tate et al. |
| 2003/0156700 A1 | 8/2003 | Brown et al. |
| 2004/0010472 A1 | 1/2004 | Hilby et al. |

* cited by examiner

CALL ROUTING APPARATUS

PRIORITY CLAIM

This application claims the benefit under 35 U.S.C. 119(e) of U.S. Provisional Application No. 60/278,570, filed Mar. 22, 2001, and U.S. Provisional Application No. 60/309,142, filed Jul. 30, 2001, and is a continuation application of U.S. application No. 10/106,517, filed Mar. 22, 2002, now U.S. Pat. No. 6,968,174, all of which are incorporated herein by reference in their entirety.

BACKGROUND OF THE INVENTION

1. Field of the Invention

The present invention relates generally to telecommunications, and in particular to systems and methods for routing and placing telephone calls.

2. Description of the Related Art

The conventional public switched telephone network (PSTN) provides for pay-per-call network services via one or more designated numbers, such as a 900 or 976 number, whereby consumers can call such a designated number and be charged a flat rate or per minute charge for a service. For example, the service may be providing entertainment information, sports information, or the like. The fee associated with calling such designated numbers is greater than the cost of simply transmitting the call. However, conventional commerce systems fail to provide an automated apparatus that places or routes calls to such pay-per-call numbers or services as part of an online purchase transaction. Thus, consumers are deprived of making secure online purchases using the pay-per-call service.

SUMMARY OF THE INVENTION

The present invention is related to systems and methods for routing and placing telephone calls. Embodiments of the present invention provide consumers with a reliable, secure, and convenient method of utilizing a telecommunications network to pay for goods or services on a one-time or recurring basis.

In particular, embodiments of the present invention provide apparatus and methods for a system connected to the PSTN to place an authorized call to a pay-per-call number, such as a 900 or 976 number, or the like, on behalf of a user to purchase a good or service. Advantageously, embodiments of the disclosed systems and methods optionally eliminate the need for a consumer to place a call to a pay-per-call service directly. This is in contrast to conventional systems wherein a consumer uses a home telephone to directly call a 900 or 976 pay-per-call telephone number.

Optionally, in one embodiment a user does not have to communicate private billing information, such as credit card or checking account information, to pay the provider of the good or service. The resulting security and convenience of this payment method can further encourage transactions involving the purchase or lease of goods or services, benefiting both the user and the service provider or merchant. In addition, the offer and/or payment options can be specifically tailored to the consumer. In addition, embodiments of the present invention enable a merchant or service provider to discover whether a user has blocked pay-per-call services and to disallow this payment method or instruct the user in ways to unblock these services.

In one embodiment, when a user is transacting an online purchase transaction using a computer terminal and wants to charge the purchase price to the user's phone bill, a message is transmitted to a remote call manager system. The message can include information related to the purchase price and an ANI associated with a phone line of the user. The remote call manager system sets an ANI of a call service phone line be the same as the user ANI. The call manager system then calls a pay-per-call service via the call service phone line using the user ANI. Thus, the call manager is in effect making the call on behalf of the user by appearing to be the user, even if the call placed by the call manager system is originating from a network location out of the user's local calling area or state. The user is then billed for the call on the user's phone bill in an amount corresponding to the purchase price.

In another embodiment, in response to a user initiating an online purchase via a client terminal, a call manager system transmits over a computer network, such as the Internet, instructions to the client terminal to schedule an outcall from the client terminal to a pay-per-call phone number. The client terminal will then place a call to the pay-per-call phone number in accordance with the instructions.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The present invention will be more fully understood by reference to the following drawings, which are for illustrative purposes only.

DETAILED DESCRIPTION OF PREFERRED EMBODIMENTS

The present invention is related to systems and methods for routing and placing telephone calls. As will be described in greater detail below, embodiments of the present invention provide apparatus and methods for initiating a telephone call using the public switched telephone network (PSTN) to a pay-per-call number on behalf of a user in response to a user operation received over a computer network, such as the Internet.

Figure 1:
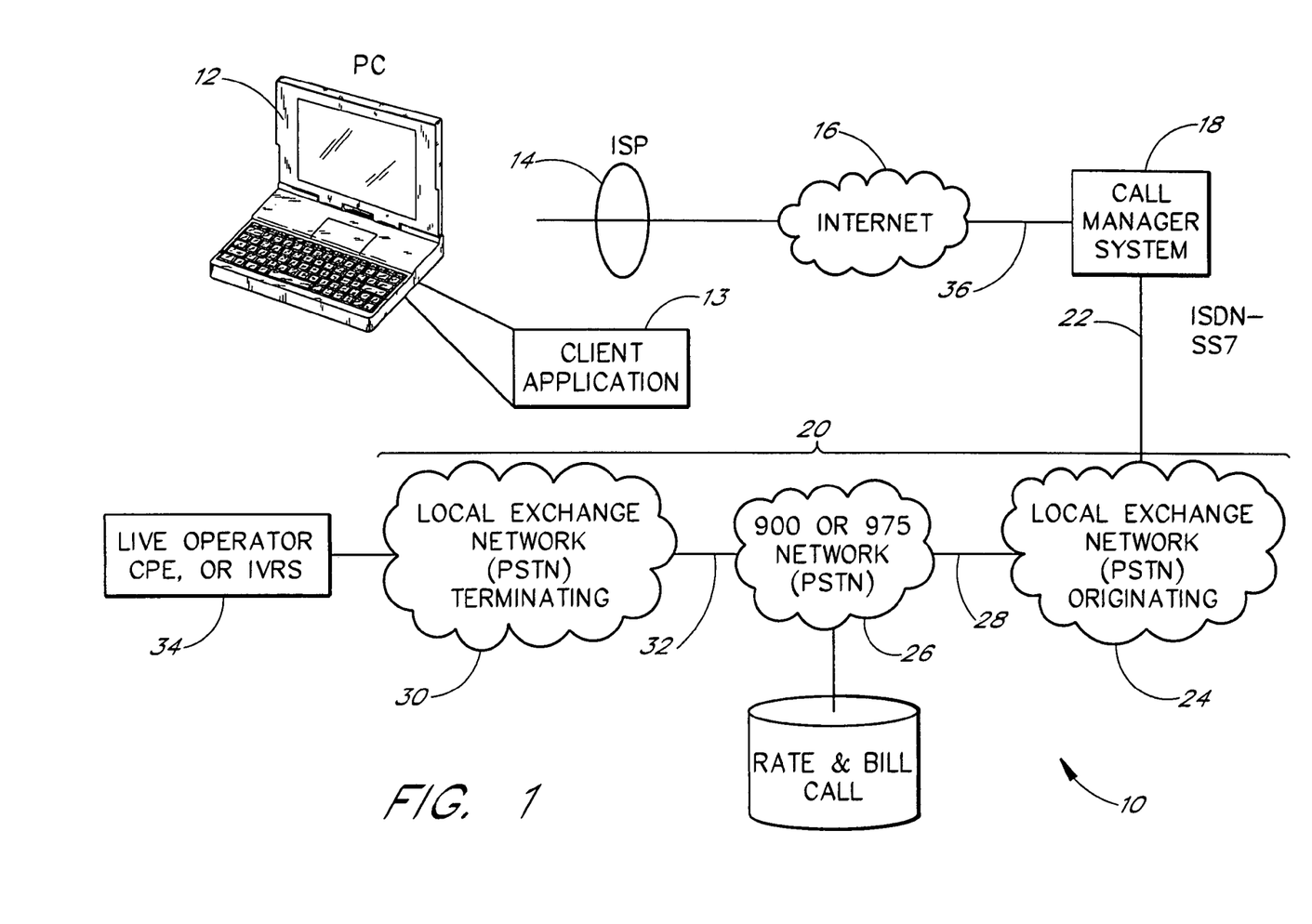
FIG. 1 illustrates an example system that can be used in accordance with one embodiment of the present invention.

Referring to FIG. 1, a telecommunications system 10 is shown utilizing an example embodiment of the present invention. In this example embodiment, a subscriber or other user employs a networked terminal, such as a personal computer (PC) 12, an interactive television, a personal digital assistant, a cellular phone equipped with a browser, or the like, to access a computer network 16, such as the Internet or the like.

Thus, for example, the terminal 12 and/or a call manager system 18 discussed below, can correspond to a uniprocessor or multiprocessor machine. Additionally, the terminal 12 and/or a call manager system 18 discussed below, can include an addressable storage medium or computer accessible medium, such as random access memory (RAM), an electronically erasable programmable read-only memory (EEPROM), masked read-only memory, one-time programmable memory, hard disks, floppy disks, laser disk players, digital video devices, Compact Disc ROMs, DVD-ROMs, other optical media, video tapes, audio tapes, magnetic recording tracks, electronic networks, and other techniques to transmit or store electronic content such as, by way of example, programs and data.

In one embodiment, the terminal 12 and/or a call manager system 18 discussed below, is equipped with a network communication device such as a network interface card, a modem, Infra-Red (IR) port, a wireless network interface, or other network connection device suitable for connecting to a network. For example, the terminal 12 and/or the call manager system 18, can include a dial-up, narrow-band, modem or a dedicated, broadband, modem that connects to a data communication service, such as that provided by an Internet Service Provider (ISP) or Commercial Online Service 14. Furthermore, the terminal 12 and/or the call manager system 18 can execute an appropriate operating system, such as Linux, Unix, Microsoft® Windows® 3.1, Microsoft® Windows® 95, Microsoft® Windows® 98, Microsoft® Windows® NT, Microsoft® Windows® 2000, Microsoft® Windows® Me, Microsoft® Windows® XP, Apple® MacOS®, IBM® OS/2®, Microsoft® Windows® CE, Palm OS®, or Sun Solaris®. The appropriate operating system may advantageously include a communications protocol implementation, which handles incoming and outgoing message traffic passed over the network. In other embodiments, while the operating system may differ depending on the type of terminal, the operating system may continue to provide the appropriate communications protocols necessary to establish communication links with the network.

While online to the Internet 16 or other network, the user may be presented with one or more offers to purchase a product or a service transmitted over the Internet to the user. The phrase "purchase" as used herein includes a lease or licensing of a good or service. The offers may come in a plurality of forms such as via an email, a banner ad, a web page, and/or a collection of some or all of these forms. By way of example, the offers may be provided in response to a user visiting a specific Web site or by accessing a given network resource or URL. A user may initiate a purchase of a product or service by filling in purchase data, activating a purchase link or other command, by accessing a specific network resource, or by otherwise authorizing a purchase.

If a user makes a purchase decision and authorizes the merchant or service provider to place the charge for the good or service on their phone bill, a message is sent over the Internet 16 to the call manager system 18. As discussed above, the user can complete a web form or activate a link in an email message. The web form or form associated with the email link may ask the user if the user wants to pay for the purchase via their phone bill. If the user indicates that the purchase price is to be billed to the user's phone bill, a corresponding message is sent by the merchant or service provider to the call manager system 18. In one embodiment, the web form requests that the user provide a telephone number or account number to which the purchase is to be billed. The merchant or service provider can verify via a merchant user database or the like that the user has permission to authorize a charge to the provided number.

The call manager system 18 includes a user database that stores user registration information, identification information, account information, billing information and the like. In one embodiment, the call manager is implemented using one or more servers. The call manager system 18 is connected to the Public Switched Telephone Network 20 by means of a trunk interface 22 and to the Internet 16 via data connection 36.

In one example embodiment, the message sent in response to the purchase request can contain one or more billing attributes or parameters. For example, the message can contain an account identifier, such as a phone number, user identifier, password, or other identifier. Other information which may be passed in the message can include the amount of the charge, whether the charge is recurring, such as whether the charge is a daily, weekly, monthly, or a one-time charge, and the like. In one embodiment, the call manager system 18 immediately, or at a scheduled or a delayed time, originates a call over trunk connection 22 to the Public Switched Telephone Network 20 to a "900", "976" or other pay-per-call number. As used herein, the terms "900 number", "900 service", "900/976 service", and the like, denote all such pay-per-call numbers and services. Thus, the invention is not limited to a particular pay-per-call service, but is generally applicable to such services.

The call may be to a pay-per-call number that is associated with a specific cost that corresponds to the price of the good or service being purchased. For example, in response to a user's request to purchase a $10 item, the call manager system 18 calls a number for which there is a $10 charge per call. Similarly, in response to a user's request to purchase a $15 item, the call manager system 18 calls a number for which there is a $15 charge per call. Alternatively, in response to a user purchase instruction, the call manager system 18 places a call to a pay-per-call number that can vary based on a database query and an interaction with the billing and rating system. Using still another process, in response to a user purchase instruction, the call manager system 18 places a call to a pay-per-call number that is associated with a specific cost per minute. For example, in response to a user's request to purchase a $10 item, the call manager system 18 places a call for 10 minutes to a number for which there is a $1 per minute charge.

By way of example, the call manager system 18 delivers, over a signaling channel, such as an SS7 signaling channel, information identifying the origin of the call through a service known as Automatic Number Identification (ANI), or using other types of signaling information, such as a charge-to number. The ANI corresponds to the caller's phone number. ANI is well known to one of ordinary skill in the art of telephony systems and will not be described further here.

In one example embodiment, the call manager system 18 modifies the ANI that would normally be associated with a call manager system phone line by setting the ANI to be the ANI (e.g., phone number) of the user who has authorized the purchase. Thus, in one embodiment, the call manager system 18 is in effect making the call on behalf of the user by appearing to be the user, even if the call placed by the call manager system 18 is originating from a network location out of the user's local calling area or state.

Optionally, as illustrated in FIG. 1, the present invention can be utilized with a Common Channel Signaling system, such as Signaling System 7 (SS7), having separate voice/user data and signaling channels. In addition, the present invention can be used with other signaling methods, such as ISDN, Advanced Intelligent Network (AIN), and/or MF inband signaling. However, the invention is not limited to these methods and contemplates other methods in which ANI or similar signaling information can be passed.

The originated call initiated by the call manager system 18 transits an Originating Local Exchange Network (OLEN) 24 to a pay-per-call services network 26 through an interconnecting trunk 28, and eventually to a Terminating Local Exchange Network (TLEN) 30 through an interconnecting trunk 32. The TLEN 30 is optionally connected to a live operator or to customer premise equipment 34 operated by a service provider, a merchant, an online merchant, or a third party on behalf of the merchant or service provider. The process of a phone call or interworkings of a pay-per-call service network are well known to one of ordinary skill and will not be described here.

In one embodiment, rather then using a live operator to answer the call placed by the call manager system 18, the call is answered by an Interactive Voice Response System (IVRS) operated by a service provider or a merchant. The PSTN connects to the IVRS via a telephone trunk. The telephone trunk has an associated signaling channel. The signaling channel is provided to communicate the ANI to the IVRS to enable the IVRS to customize the interaction as described below. The IVRS, connected to the phone network, can collect and store the ANI information for the call.

The collected and stored ANI can be used to identify the user for post bill auditing, or to customize the interaction, such as to selectively restrict answered calls to known users, to identify the billed amount, play audio announcements, record voice messages, collect and store touch-tone responses, and transfer calls. Similarly, the ANI can be used to identify the user to determine what rate or price the user is entitled to for a good or service. For example, some users may be entitled to a discounted rate. The IVRS system 34 can be included in the call manager system 18 or can be a separate system from the call manager system 18.

The pay-per-call service then bills the user for the purchased services or goods based on the length of the call, a flat rate charge, or using customized or proprietary signaling information as discussed above sent from the IVRS into the pay-per-call services network 26. The charge may appear on the user's local or long distance carrier's bill for the user. The interworking of a pay-per-call service are well known and not described here.

Figure 2:
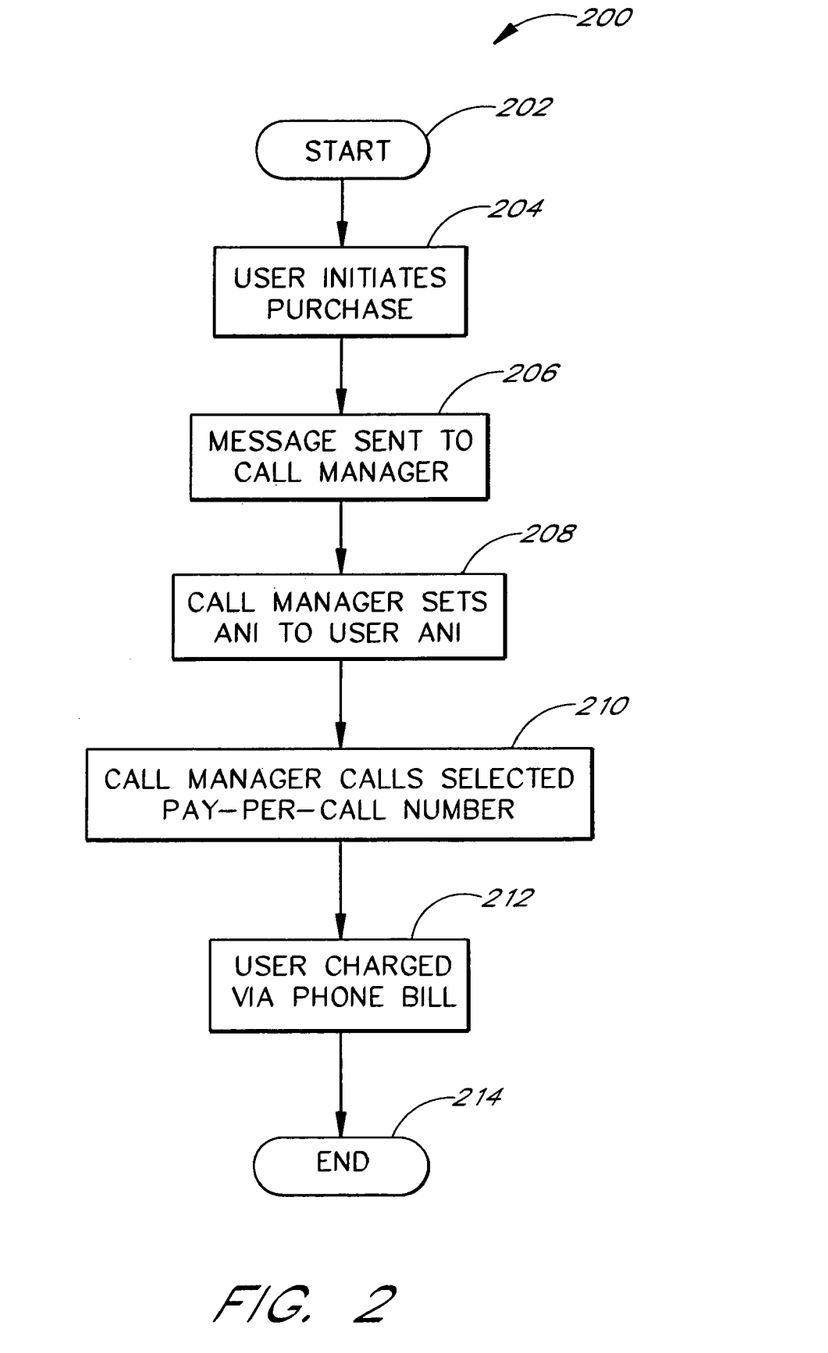
FIG. 2 illustrates an example method of routing calls.

FIG. 2 illustrates one example process 200 of placing a call to a pay-per-call service. Starting at start state 202, the process 200 proceeds to state 204, wherein a user initiates a purchase and indicates that the purchase price is to be billed to the user's phone bill. At state 206 a message is sent to the call manager system, including the user's phone number and the purchase price amount to be charged to the user's phone bill. At state 208 the call manager sets an ANI associated with an outbound call to be the same as the user's ANI. At state 210 the call manager system selects and calls an appropriate pay-per-call number using the user's ANI. Thus, it will appear to the pay-per-call service that the user is placing the call. The pay-per-call number can be selected based on, or to correspond with the amount of the purchase price. At state 212 the pay-per-call services causes the purchase price amount to be charged to the user via the user's long distance or local phone bill. The process 200 ends at state 214.

In another embodiment, the call manager system 18 directs a call to the pay-per-call network 28 via the PC or other terminal 12 without manual intervention by the user or other persons. In this embodiment, the user utilizes the networked computer 12 to connect to a data communication service via a dial-up or dedicated connection, such as that provided by the ISP 14. If the user makes a purchase decision while online and authorizes the merchant or service provider to place the charge for the good or service on the phone bill of the user, this event is logged in the call management system 18. For example, a user can complete a web form or activate a link in an email message, which causes a message to be sent to the call manager system 18, or the user can engage in a direct interaction with the call management system 18 database. For example, the user can make purchases directly from the operator of the call management system 18 which will then arrange to have the corresponding charge appear on the user's phone bill. A message is then sent from the networked computer 12 to the call manager system 18.

Upon receipt of the message or transaction event, the call manager system 18 instructs a networked computer client application 13 over the Internet to schedule an outcall to a pay-per-call phone number. The client application 13 can be a small software agent executing on the client terminal 12 that monitors the user's online access.

The call manager system 18 monitors the user's session or the presence of the user on the Internet. In one embodiment, the client application 13 can make the user's online presence known to the call manager system 18. In particular, the call manager system 18 communicates with the client application 13 to determine whether the computer 12 is online. Presence detection can be performed by call manager system 18 polling or pinging the computer terminal 12 via the client application 13, or by the client application 13 transmitting an "I'm alive" message and subsequent periodic "keep alive" messages to the call manager system 18.

The schedule for placing the call from a user could be immediate. In this case, if the computer 12 is accessing the Internet 16 over the user's telephone line via a dial-up connection, the user's networked computer 12 is disconnected from the Internet and a call is placed from the networked computer 12 to the call management system 18, as described in greater detail below. Alternatively, the call schedule can be set for when the user goes offline, when the user next goes back online, the next day, month, year, or at the occurrence of other specified time or event.

Thresholds on call retries and frequency are optionally established between the networked computer client application 13 and call management system 18 to reduce the impact on the availability of the user's phone line. For example, the client may be restricted to no more than one call attempt within a 24-hour period. In addition or alternatively, the networked computer-client application 13 can be restricted from making a call attempt if a user has received an incoming call within a predetermined amount of time. Thus, for example, a call may be placed by a caller to the user while the user's telephone line is being utilized to by the user's computer terminal. The call is then forwarded to the call manager system 18 which transmits a notification to the user via email or the client application 13 regarding the forwarded call. If the user then goes offline within a predetermined amount of time, such as within 5 minutes, it may be assumed that the user is calling the caller back. Therefore, in order to avoid tying up the user's phone line, the call to the pay-per-call number may be scheduled for another time, such as the next time the user goes online.

When the client application 13 receives an instructional message from the call manager system 18 to place a call for billing purposes, the client application 13 uses dialer software and a modem associated with the networked computer 12 to place a call to the telephone number provided by the call manager system 18 via a dial-up or always-on connection, or to place a call to a number pre-provisioned and stored on the computer 12 in conjunction with the client application 13.

The call is switched at a local exchange switch, such as the OLEN 24, and connects with the pay-per-call network 26, where after the amount and transaction request are processed according to a predetermined plan, such as charging for a good or service at a predetermined price by calling a corresponding pay-per-call number. The call origin or source is identified using ANI or a similar service that provides the user's telephone number. The ANI establishes a billing number from the identified telephone number, and passes this information to the pay-per-call network 28 for billing purposes.

Figure 3:
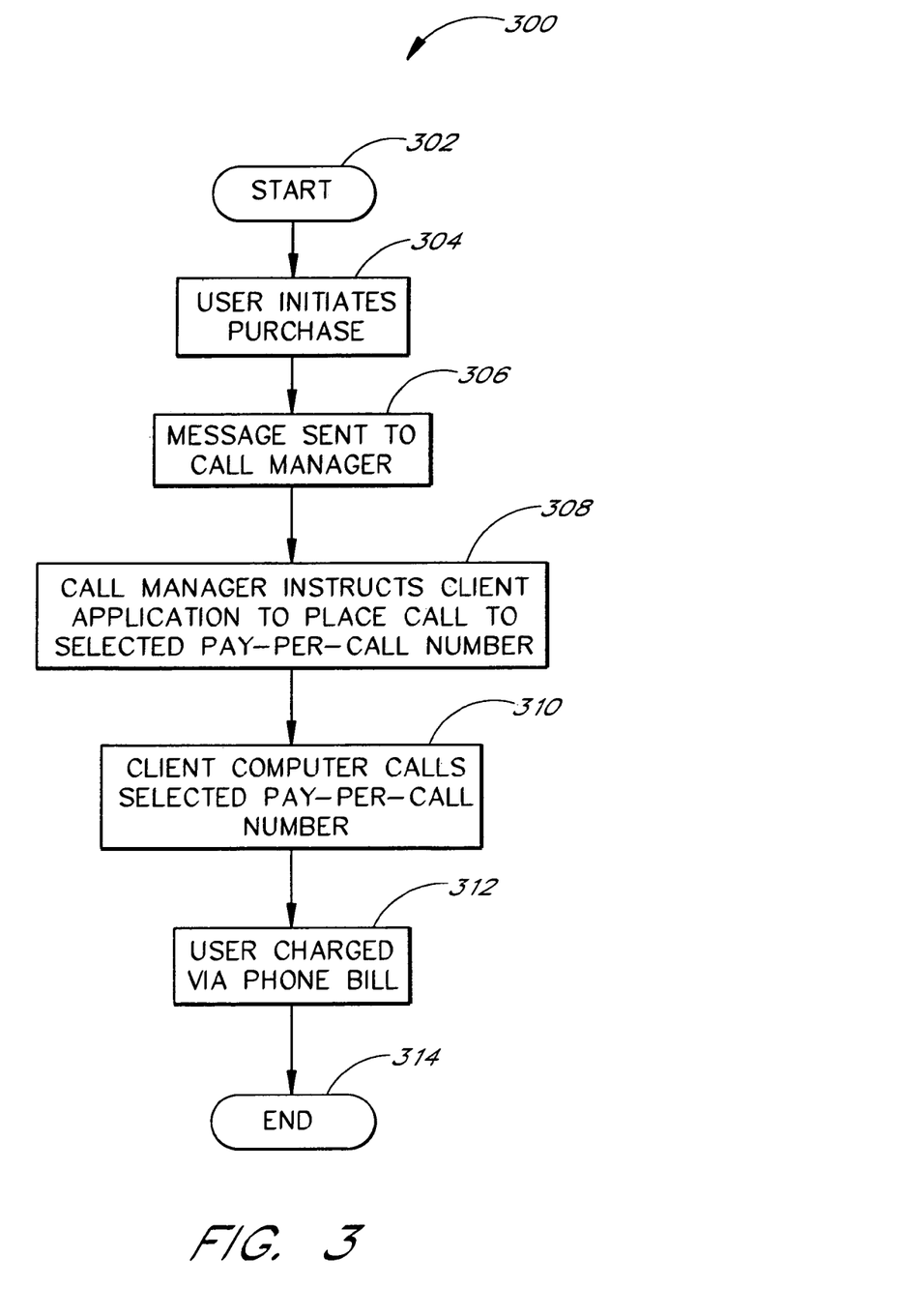
FIG. 3 illustrates another example method of routing calls.

FIG. 3 illustrates an example process 300 of placing a call to a pay-per-call service employing a user's computer. Starting at start state 302, the process 300 proceeds to state 304, wherein a user initiates a purchase and indicates that the purchase price is to be billed to the user's phone bill. At state 306 a message is sent to the call manager system, including the user's phone number or other account identifier, and the purchase price amount to be charged to the user's phone bill. At state 308 the call manager instructs the client application executing on the user's computer to call a pay-per-call number selected based at least in part on the purchase price. At state 310 the user's computer calls the selected pay-per-call number. At state 312 the pay-per-call services causes the purchase price amount to be charged to the user via the user's long distance or local phone bill. The process 300 ends at state 314.

In one embodiment, the client application 13 is autonomous or semi-autonomous. That is, the client application 13 detects or is directly informed by the merchant when the user is making a purchase. The client application 13 uses a look-up table stored on the computer 12 that lists a plurality of pay-per-call numbers and the corresponding charges for calls to those numbers to determine the appropriate pay-per-call number to call for the purchase. The client application 13 then initiates a call via the computer 13 to the appropriate pay-per-call number. The look-up table may periodically be updated by the call manager system 18.

In some embodiments, optionally including the embodiments described above, the call manager system 18 automatically checks the balance due for an account after the user logs in to the call manager system 18 by accessing the user database. If the call manager system 18 finds a balance due on the account, the call manager system 18 passes a message to the networked computer 12. The message may notify the user of the outstanding balance, request payment of the outstanding balance or a portion of thereof, or other like actions prior to proceeding with the established session. The call manager system 18 may effect a payment transaction via the previously described billing systems and methods; update the user's account to reflect the payment transaction; and notify the user of the action taken on the account via a message to the networked computer 12.

In addition, the call manager system 18 optionally determines if a user's phone line is blocked from pay-per-call services. In one embodiment, this is accomplished using the following example procedure. Assuming that the user computer 12 is accessing the Internet using a broadband connection, the call manager system 12 transmits a request to the networked computer client application 13 to place a call in real-time while a user is transacting an order from a web site over the broadband connection. If it is determined that the user's line is blocked, then the user, while still transacting the order on the web, can be informed that another form of payment will be required. This should further improve the billing and collection conversion rates of the service provider or merchants.

The determination of whether the user's line is blocked from pay-per-call services can be performed using several different processes, and the response thereto can vary as well. For example, the call manager system 12 may transmit a request to the networked computer client application 13 to place a call to a pay-per-call number associated with the call manager system 12. If the call manager system 12 fails to receive the call after one or more attempts, a determination is made that the user's line is blocked from making such a call. Even is the call is received and the ANI read, the call manager 12 may not answer the call to avoid billing the user. Optionally, the call may only be answered if there is a user balance due. A notation may be used in the user's account information that the user's line is blocked so further attempts will not be made. Instead, if the user in the future requests to make a purchase using a pay-per-call process, the user may automatically be requested to provide payment using an alternate method or instructions on how to unblock their line. In another embodiment, the call manager system 12 may transmit a request to the networked computer client application 13 to place a call to a pay-per-call number, and if an operator answers indicating that the call cannot be completed, a determination is made that the call was answered by a human voice and it is inferred that the user's line is blocked.

Figure 4:
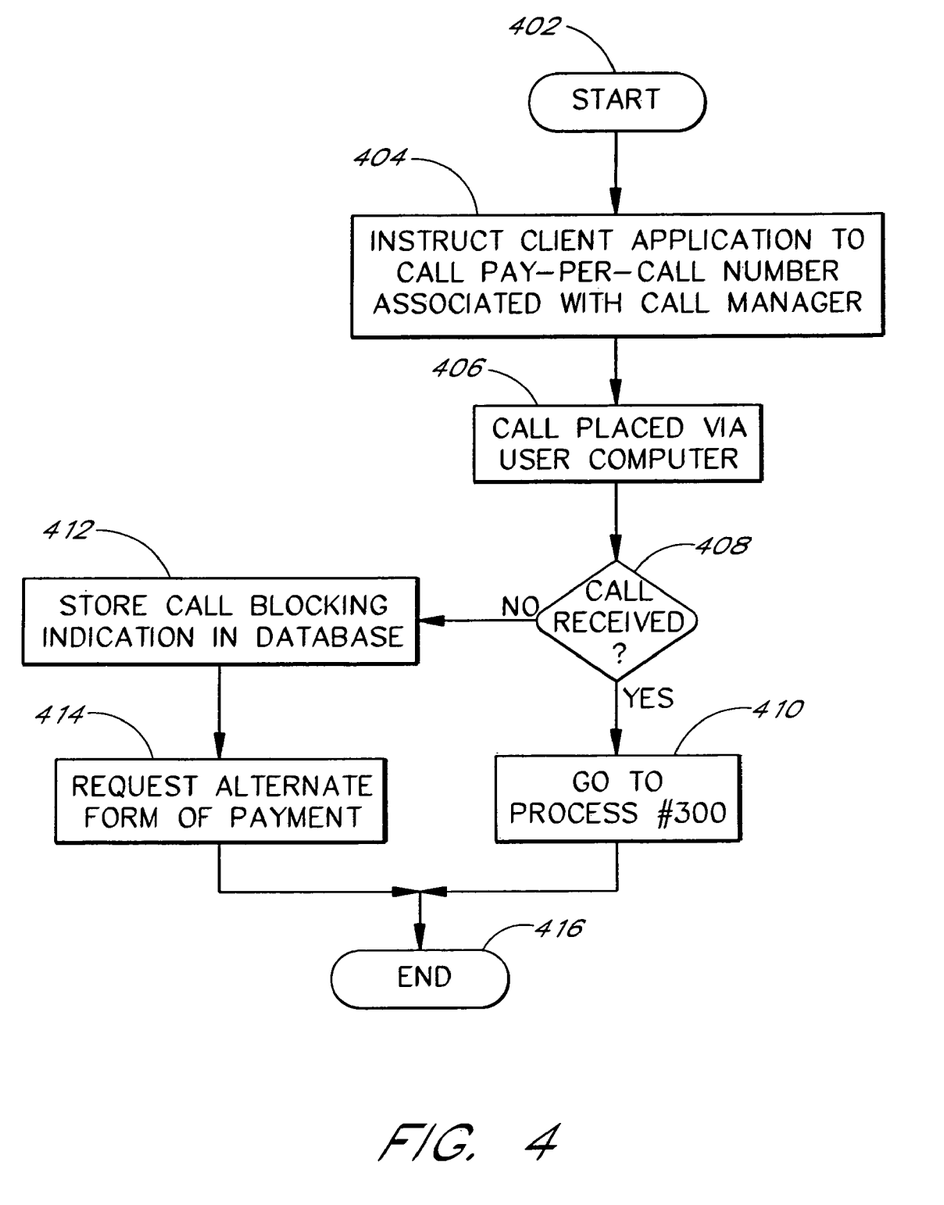
FIG. 4 illustrates an example method of detecting whether a user has pay-per-call blocking.

FIG. 4 illustrates an example process 400 used to detect whether a user's phone is blocked from calling a pay-per-call service. Beginning at start state 402, the process proceeds to state 404. At state 404, the call manager transmits an instruction to a client application to call a designated pay-per-call number, such as a 900 number, associated with the call manager system. At state 406, the client application instructs the user's computer or other terminal to call the designated pay-per-call number for the purpose of determining whether the user's line is blocked from placing a pay-per-call number. While the call is to a pay-per-call number, in the example process 400 the user is not charged for the call.

At state 408, the call manager system monitors incoming calls on the pay-per-call number to determine if the user's computer succeeded in placing the call. Note that the call need not be answered to succeeded in placing the call. Success is defined in one embodiment by the user's ANI being received. The call manager can determine from which number a call is placed via the ANI transmitted along with the call. If a call is received from the user computer, the process 400 proceeds to state 410 and then optionally can perform the purchase and call placement process 300 illustrated in FIG. 3. If instead a call is not received from the user's computer at the designated pay-per-call number, the user's account information stored in the user database is annotated to indicate that the user's phone line is blocked from calling pay-per-call phone numbers. At state 414, the call manager sends a request to the user's computer asking the user to provide an alternate form of payment, such as a credit card charge or a check. The process 400 ends at state 416.

If the blocking determination is made in real-time, the user can be offered an alternative payment method while transacting the order. In one embodiment, the blocking determination could be made in advance, and the user could be offered other payment options automatically when the user attempts to make a transaction. Further, if an advance blocking determination is made, the user could be offered only those goods or services that do not require use of a pay-per-call type service. Additionally, the user is optionally offered a description on how to unblock pay-per-call type services on their phone line. The advance determination can be made by, for example, accessing the user database to determine if a pay-per-call blocking notation or indication has been provided.

Thus, as described above, embodiments of the present invention provide consumers with a reliable, secure, and convenient method of utilizing a telecommunications network to pay for goods or services using pay-per-call services.

Although the description above contains many specifics, these should not be construed as limiting the scope of the invention but as merely providing illustrations of some of the presently preferred embodiments of this invention. Therefore, it will be appreciated that the scope of the present invention fully encompasses other embodiments that may become obvious to those skilled in the art.

What is claimed is:

1. A method of placing a call, comprising:
receiving information over a network related to a user's online purchase request, wherein the request is made via a website; and
at least partly in response to receiving the information related to the user's online purchase request, causing a call to be placed by an electronic system to a pay-per-call type telephone service via a public communications network, wherein the pay-per-call type telephone service is not the subject of the online purchase request and the call is not connected to a telephone of the user while the user is on the telephone,
wherein the call provides billing information associated with the user to the pay-per-call type telephone service and wherein the user is billed for a purchase price associated with the online purchase request at least partly in response to the call placed to the pay-per-call type telephone service.

2. The method as defined in claim 1, wherein the billing information includes at least a phone number associated with the user.

3. The method as defined in claim 1, wherein the pay-per-call type telephone service bills the user for the purchase price based on a flat rate charge.

4. The method as defined in claim 1, further comprising selecting a pay-per-call type telephone service telephone number based at least in part on the purchase price.

5. The method as defined in claim 1, wherein the call to the pay-per-call type telephone service is automatically placed by the user's computer in response to a command received over a computer network from a processing system.

6. The method as defined in claim 1, wherein the call to the pay-per-call type telephone service is placed at least partly in response to determining that a computer associated with the user has ceased accessing a first computer network.

7. The method as defined in claim 1, further comprising determining if at least one user's phone line is blocked from placing pay-per-call type calls.

8. The method as defined in claim 1, wherein at least partly in response to determining that the at least one user's phone line is blocked, notifying the at least one user that another form of payment is to be provided.

9. The method as defined in claim 1, further comprising causing a plurality of calls to the pay-per-call service spaced out in time in response to a second purchase request.

10. The method as defined in claim 1, wherein the online purchase is for goods.

11. The method as defined in claim 1, wherein the online purchase is for a service.

12. The method as defined in claim 1, wherein the call placed to the pay-per-call type telephone service is answered by an interactive voice response system.

13. A method of placing a call, comprising:
receiving information over a network related to a user's purchase request, wherein the purchase request is made via an email or via a network site; and
at least partly in response to receiving the information related to the user's purchase request, causing a call to be placed by an electronic system to a pay-per-call type telephone service over a communications network, wherein the pay-per-call type telephone service is not the subject of the purchase request,
wherein the user is billed for an amount associated with the purchase request at least partly in response to the call placed to the pay-per-call type telephone service,
wherein the call is not connected to a telephone of the user while the user is on the telephone.

14. The method as defined in claim 13, wherein the call provides billing information including at least a phone number associated with the user.

15. The method as defined in claim 13, wherein the pay-per-call type telephone service bills the user for the amount based on a flat rate charge.

16. The method as defined in claim 13, further comprising selecting a pay-per-call type telephone service telephone number based at least in part on the amount.

17. The method as defined in claim 13, wherein the call to the pay-per-call type telephone service is automatically placed by the user's computer in response to a command received over a computer network from a processing system.

18. The method as defined in claim 13, wherein the call to the pay-per-call type telephone service is placed at least partly in response to determining that a computer associated with the user has ceased accessing a first computer network.

19. The method as defined in claim 13, further comprising determining if a first user's phone line is blocked from placing pay-per-call type calls.

20. The method as defined in claim 13, wherein at least partly in response to determining that a first user's phone line is blocked, notifying the first user that another form of payment is to be provided.

21. The method as defined in claim 13, further comprising causing a plurality of calls to the pay-per-call service spaced out in time in response to a second purchase request.

22. The method as defined in claim 13, wherein the purchase request is for goods.

23. The method as defined in claim 13, wherein the purchase request is for a service.

24. The method as defined in claim 13, wherein the call placed to the pay-per-call type telephone service is answered by an interactive voice response system.

25. The method as defined in claim 13, wherein the email to the user includes an offer of a good or service, and the purchase request is made by activating a link in the email.

26. The method as defined in claim 13, wherein the network site in a website.

* * * * *